United States Patent [19]
Minematsu et al.

[11] Patent Number: 4,979,028
[45] Date of Patent: Dec. 18, 1990

[54] VIDEO TELEPHONE
[75] Inventors: Toru Minematsu; Haruki Nagayama, both of Kanagawa, Japan
[73] Assignee: Sony Corporation, Tokyo, Japan
[21] Appl. No.: 354,821
[22] Filed: May 22, 1989
[30] Foreign Application Priority Data May 30, 1988 [JP] Japan ................... 63-132101
May 31, 1988 [JP] Japan ................... 63-133021

[51] Int. Cl.$^5$ .................. H04N 7/12; H04N 1/42
[52] U.S. Cl. ........................ 358/85; 379/53; 358/134; 358/261.4
[58] Field of Search ............ 358/85, 133, 134, 261.4, 358/431; 379/53, 54

[56] References Cited
U.S. PATENT DOCUMENTS
4,650,929 3/1987 Boerger et al. ................. 358/86

FOREIGN PATENT DOCUMENTS
52-50611 4/1977 Japan ........................ 379/53
62-216593 9/1987 Japan .
63-142986 6/1988 Japan ........................ 379/53
63-263982 10/1988 Japan ........................ 379/53
1-34082 2/1989 Japan .
1-34083 2/1989 Japan .
1-34084 2/1989 Japan .
1-51883 2/1989 Japan .
2206465 1/1989 United Kingdom ................. 379/53
2211048 6/1989 United Kingdom .

Primary Examiner—Jin F. Ng
Assistant Examiner—Wing F. Chan
Attorney, Agent, or Firm—Lewis H. Eslinger; Jay H. Maioli

[57] ABSTRACT

A video telephone displays a still picture in a first picture mode and a still picture in a second picture mode, which is smaller than that of the first picture mode, using image data transmitted over an audio signal transmission line and includes a memory having an address capacity corresponding to the size of the still picture in the first picture mode. In this video telephone, when image data of the still picture in the first picture mode is received, the image data is written in all addresses of the memory and, when image data of the still picture in the second picture mode is received, the image data is written only in predetermined addresses of the memory. This permits the same display read-out for all addresses of the memory to display the still picture whether in the first or second picture mode.

12 Claims, 7 Drawing Sheets

FIG. 5

| 0 | 1 | 2 | - | - | - | - | - | - | - | - | - | - | - | 158 | 159 |
|---|---|---|---|---|---|---|---|---|---|---|---|---|---|---|---|
| 160 | 161 | 162 | - | - | - | - | - | - | - | - | - | - | - | 318 | 319 |
| 320 | 321 | 322 | - | - | - | - | - | - | - | - | - | - | - | 478 | 479 |
| ⋮ | ⋮ | ⋮ | | | | | | | | | | | | ⋮ | ⋮ |
| 15680 | 15681 | 15682 | - | - | - | - | - | - | - | - | - | - | - | 15838 | 15839 |
| 15840 | 15841 | 15842 | - | - | - | - | - | - | - | - | - | - | - | 15998 | 15999 |

160 Addresses (width), 100 Addresses (height)

FIG. 6

| 0 | 1 | - - - - | 32 | 33 | - - - - - - | 126 | 127 | - - - - | 158 | 159 |
|---|---|---|---|---|---|---|---|---|---|---|
| 160 | 161 | - - - - | 192 | 193 | - - - - - - | 286 | 287 | - - - - | 318 | 319 |
| ⋮ | ⋮ | | ⋮ | ⋮ | | ⋮ | ⋮ | | ⋮ | ⋮ |
| 15841 | 15842 | - - - - | 15872 | 15873 | - - - - - - | 15966 | 15967 | - - - - | 15998 | 15999 |

96 Addresses, 160 Addresses, 100 Addresses

FIG. 7
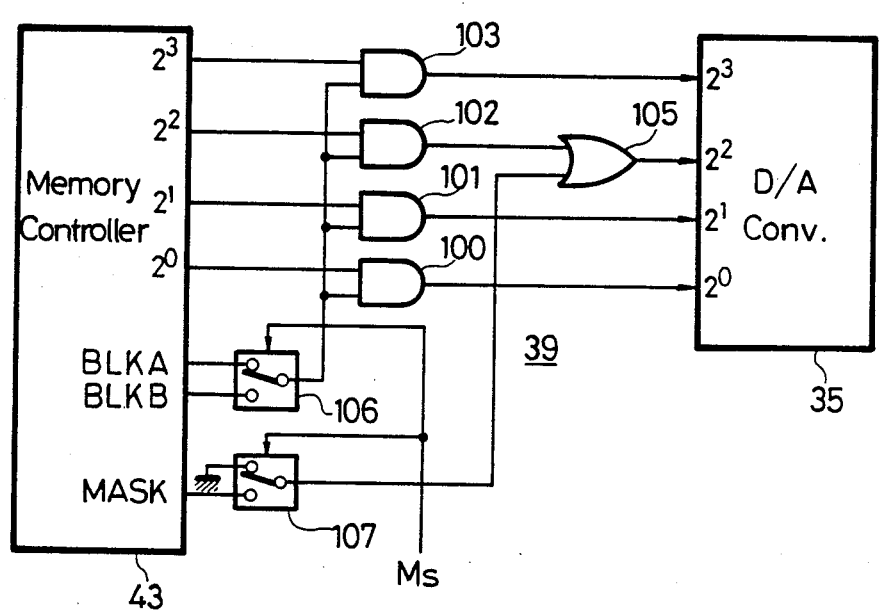
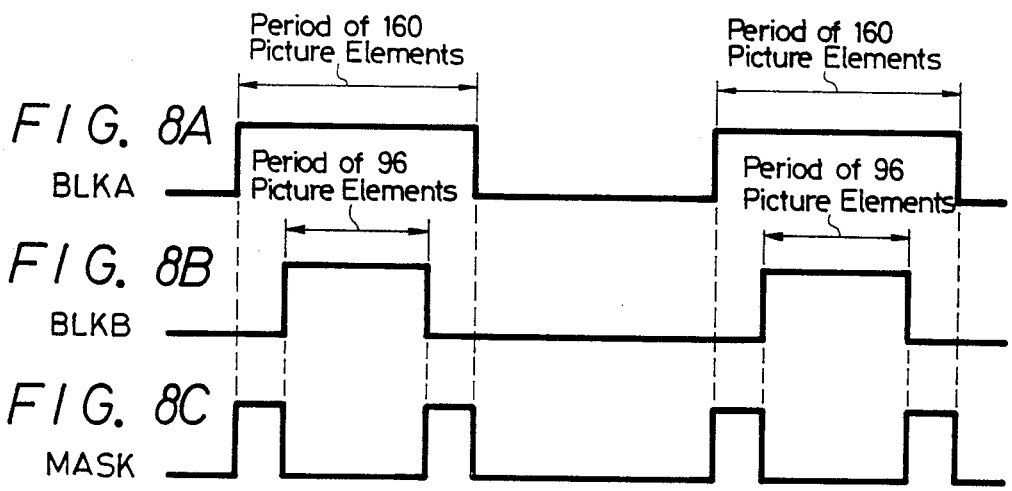
FIG. 8A BLKA
FIG. 8B BLKB
FIG. 8C MASK

VIDEO TELEPHONE

BACKGROUND OF THE INVENTION

1. Field of the Invention

The present invention relates generally to apparatus for transmitting and displaying a still picture and, more particularly, to a video telephone that can transmit and receive a still picture by utilizing a standard telephone network line.

2. Description of the Background

When a so-called video telephone is realized, a special telephone network line having a wide bandwidth is required if the video signal is to be transmitted without extensive modification. Thus, individuals typically cannot afford a video telephone, and it is relegated to corporate use where the video telephone is used for important conferences, for example.

Therefore, to be economically feasible a monochromatic, or black and white, video telephone for personal use has to employ an ordinary telephone network line. The ordinary telephone network line, however, typically is used to transmit only an audio signal and its transmission bandwidth lies in the range from about 300 to 3400 Hz. Accordingly, in this case, the image to be transmitted must be a still picture, with its video signal timebase-expanded and then transmitted.

Further, if all pixels or picture elements of one frame forming the still picture are transmitted, such transmission requires a lot of time, which is not practical in a video telephone. Therefore, the picture elements must be transmitted at predetermined intervals.

Considering the foregoing, the following standardization is proposed. Different screen modes (video formats) are described, and there are proposed modes A and B, as shown on FIGS. 1A and 1B, respectively.

FIG. 1A shows Mode A, in which there are 160 horizontal picture elements and 100 vertical picture elements, with more than 16 levels of gradation.

FIG. 1B shows Mode B, in which there are 96 horizontal picture elements and 100 vertical picture elements, also with more than 16 levels of gradation.

Assuming that there are provided 16 level gradations, then one picture element can be expressed by 4 bits. Thus, the amount of image data forming the picture screen in Mode A is expressed as: 160 picture elements×100 picture elements×4 bits=64 kbits. Similarly, the amount of image data forming the picture screen in Mode B is expressed as: 96 picture elements×100 picture elements×4 bits=38.4 kbits, FIG. 2 represents a signal format for use when image data is transmitted in which, when an outgoing call is to be made, a picture send key on the transmitting-side video telephone is depressed, and a dual tone signal DLTN is transmitted from the transmitting side to the receiving side for a predetermined period $T_1$, for example, 0.4 seconds. The reception of dual tone signal DLTN at the receiving side video telephone causes it to be switched from the standard communication mode to the picture receiving mode. To this end, the dual tone signal DLTN has a constant level and is formed by mixing signals $S_1$ and $S_2$. Signals $S_1$ and $S_2$ are produced by frequency-dividing an alternating signal Sc having, for example, a frequency fc of 3.579545 MHz, which is identical to the color subcarrier frequency in the NTSC system, into frequencies $f_1$ and $f_2$ that are expressed as:

$$f_1 = f_c/1784 = 2006 \text{ Hz} \tag{S_1}$$

$$f_2 = f_c/2192 = 1633 \text{ Hz} \tag{S_2}$$

Accordingly, the signal components of frequencies $f_1$ and $f_2$ of the dual tone signal DLTN continue for a period $T_1$, as shown in FIG. 2, so that the dual tone signal DLTN can be easily distinguished from an audio signal at the receiving side.

The period $T_1$ is followed by a blank or nonsignal period $T_2$, of, for example, 0.4 seconds. A frame synchronizing signal FSYN is transmitted during the next time period $T_3$ having a period of time equal to about 0.1 seconds. The frame synchronizing signal FSYN serves as a standard signal for frequencies and phases of the succeeding signals, as well as a signal that becomes a standard for timing relations of the succeeding signals. The frame synchronizing signal FSNY is a frequency-divided signal $S_3$ that is produced by frequency-dividing the signal Sc to a frequency $f_3$ expressed as:

$$f_3 = f_c/2048 = 1748 \text{ Hz} \tag{S_3}$$

It is to be noted that the frame synchronizing signal FSNY is formed by combining the signal $S_3$ having the phase of 0° with the signal $S_3$ having the phase of 180° in a predetermined order. The level of the frame synchronizing signal FSNY is determined to be the maximum of the signals to be transmitted. More specifically, the period $T_3$ has a time length equal to 176 cycles (=0.1 second) of the signal $S_3$.

An amplitude correcting signal ACAL is transmitted over the next time period $T_4$ that has, for example, a time duration of about 0.07 seconds. The amplitude correcting signal ACAL is used to correct the level of subsequent signals caused by variations in the transmission gains in the telephone network line of the receiving side video telephone. Therefore, the amplitude correcting signal ACAL results from amplitude-modulating and phase-modulating the signal $S_3$ by a predetermined level (16 gradations) and phase (0° or 180°), respectively, and is transmitted over a time period of 128 cycles. Thus, the duration of the period $T_4$ equals 128 cycles of the signal $S_3$.

An identification code ID is transmitted during the next period $T_5$. The identification code ID is formed of a binary code of "0" and "1" that presents the mode of the picture to be transmitted and the communication capability of the transmitting-side video telephone, so that the identification code ID is a signal provided in such a manner that the signal $S_3$ is phase-modulated by "0" or "1". The length of the period $T_5$ of the identification code ID is selected to be an integer multiple of 64 cycles of the signal $S_3$.

Image data is then transmitted during the period $T_6$ that follows period $T_5$. In this case, the image data is transmitted in such a fashion that the signal $S_3$ is amplitude-and phase-modulated by image data and the resultant modulated signal Sm is transmitted.

As shown in the waveform diagram of FIG. 3, in the case of 16 gradations one cycle of the modulated signal Sm ($S_3$) is allotted to the image data of one picture element, and the amplitude and the phase of this signal Sm are modulated in accordance with one picture element of the image data, so that when the picture element is at the black level (0th gradation) the phase of the signal Sm is 0° and the amplitude thereof is maximum, whereas when the picture element is at the white level (15th gradation) the phase of the signal Sm is 180° and the amplitude thereof is also at the maximum level.

The modulation of the signal Sm is limited so that even when the amplitude of the signal Sm is minimum, its modulated amplitude is not zero. Thus, when the amplitude of the signal Sm is minimum, the signal Sm is not lost, thereby providing the signal S₃ as a carrier signal. If there are more than 16 gradations, then the amplitude of the signal Sm is subdivided accordingly.

Mode A forms a picture of 160 picture elements × 100 picture elements and, thus:

$$T_6 = 160 \times 100 \times 1/f_3$$
$$= 9.2 \text{ seconds.}$$

In a similar fashion, mode B results in:

$$T_6 = 96 \times 100 \times 1/f_3$$
$$= 5.5 \text{ seconds.}$$

The above-noted video telephone is desired to be capable of providing the two picture modes A and B, which have a different relative size picture. To realize the foregoing, it may be considered that the picture (96 picture elements × 100 picture elements) in mode B is displayed at the central portion of the picture screen while the picture (160 picture elements × 100 picture elements) of the mode A is fully displayed on the picture screen.

OBJECTS AND SUMMARY OF THE INVENTION

Accordingly, it is an object of the present invention to provide an improved video telephone that can eliminate the above-mentioned defects inherent in known video telephones.

Another object of the present invention is to provide a video telephone in which a controller therefor has a simplified design and circuit arrangement.

A further object of the present invention is to provide a video telephone in which a plurality of image data representing pictures of different sizes can be properly displayed.

In accordance with an aspect of the present invention, there is provided a video telephone, in which image data of a still picture in a first picture mode and image data of a still picture in a second picture mode, which is smaller than that of the first picture mode, are transmitted through an audio signal transmission line and the still picture in the first or second mode is displayed. Such apparatus comprising a memory having an address capacity corresponding to the size of the still picture in the first picture mode, wherein when image data of the still picture in the first picture mode is received the image data is written in all addresses of the memory. On the other hand, when image data of a still picture in the second picture mode is received, the image data is written in predetermined addresses of the memory, thereby effecting the same display read-out for all addresses of the memory to display the still picture, whether in the first or second picture mode.

In accordance with another aspect of the present invention, there is provided a video telephone in which image data of a still picture in a first picture mode and image data of a still picture in a second picture mode, which is smaller than that in the first picture mode, are transmitted through a transmission line of audio frequency range. Such apparatus comprising a memory for storing the image data, a display for displaying the first and second picture, and a mask circuit, wherein read-out is cyclically effected for the memory to thereby read-out data stored therein. The read-out data is then supplied through the mask circuit to the display, whereby when the image data represents the second still picture, the read-out data from the memory corresponding to a portion of the picture outside the second still picture is masked by predetermined data.

The preceding and other objects, features, and advantages of the present invention will become apparent from the following detailed description of illustrative embodiments, which is to be read in conjunction with the accompanying drawings, wherein like reference numerals identify the same or similar elements.

BRIEF DESCRIPTION OF THE DRAWINGS

FIG. 5 is a pictorial representation useful in explaining an address map;

FIG. 6 is a pictorial representation useful in explaining an address map;

FIG. 7 is a schematic in block diagram form of a mask circuit used in the present invention;

FIG. 8A to 8C are waveform diagrams of mask signals present in the circuit of FIGS. 4A and 4B.

DETAILED DESCRIPTION OF PREFERRED EMBODIMENTS

Figure 1B:
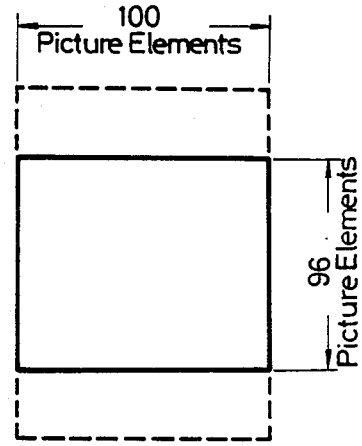
FIGS. 1A and 1B are pictorial representations of the picture sizes in modes A and B, respectively.
Figure 1A:
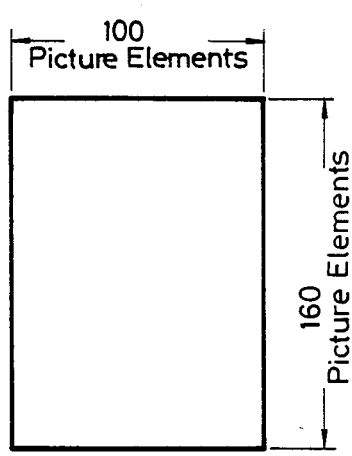
Figure 2:
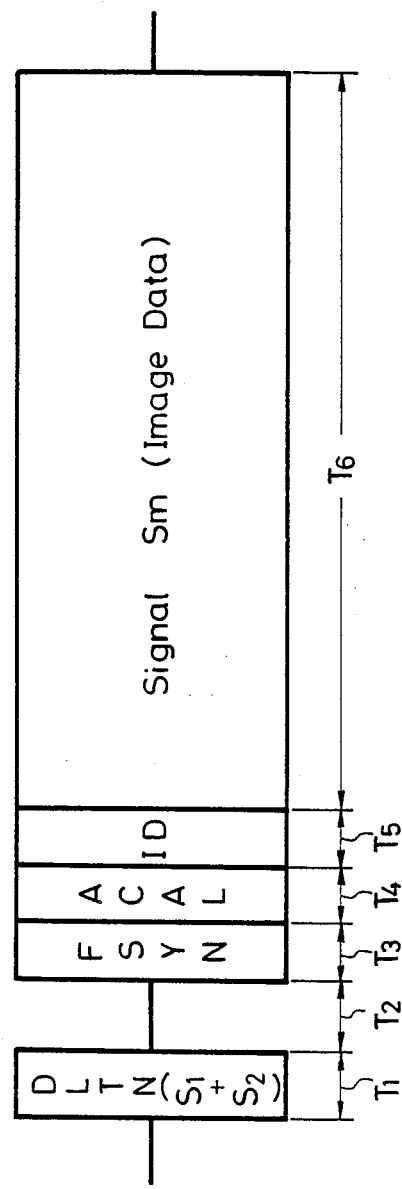
FIG. 2 is a pictorial representation of a signal format when image data are transmitted.
Figure 3:
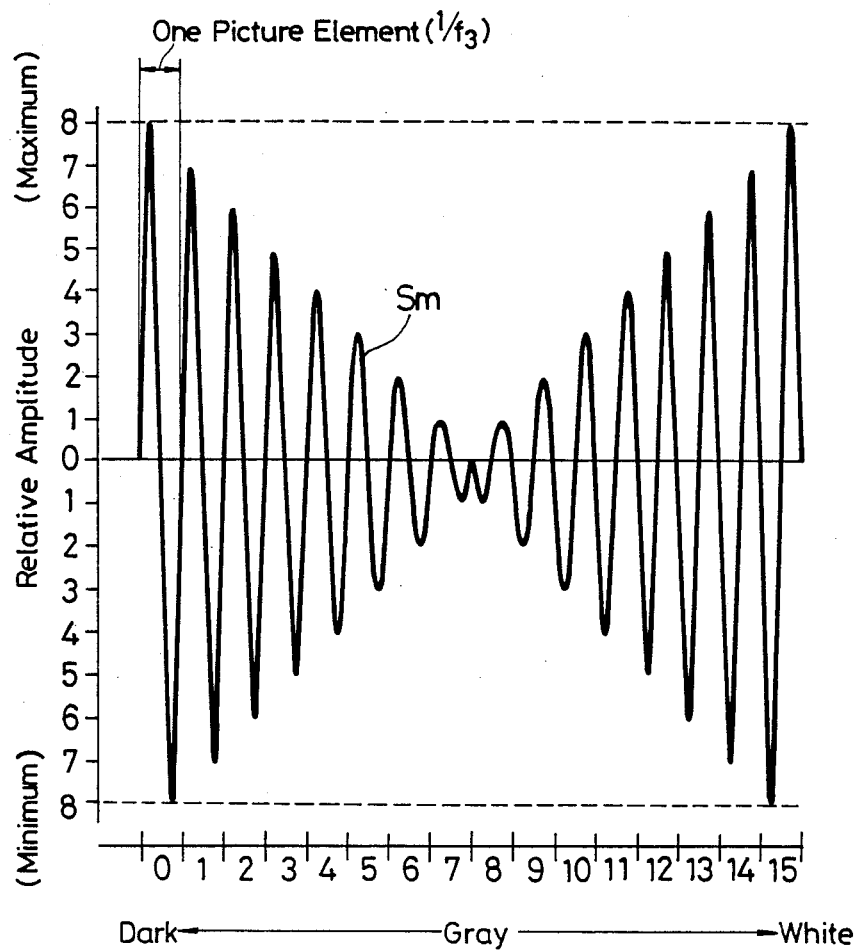
FIG. 3 is a waveform diagram useful in explaining the various level gradations present in the invention.
Figure 4A:
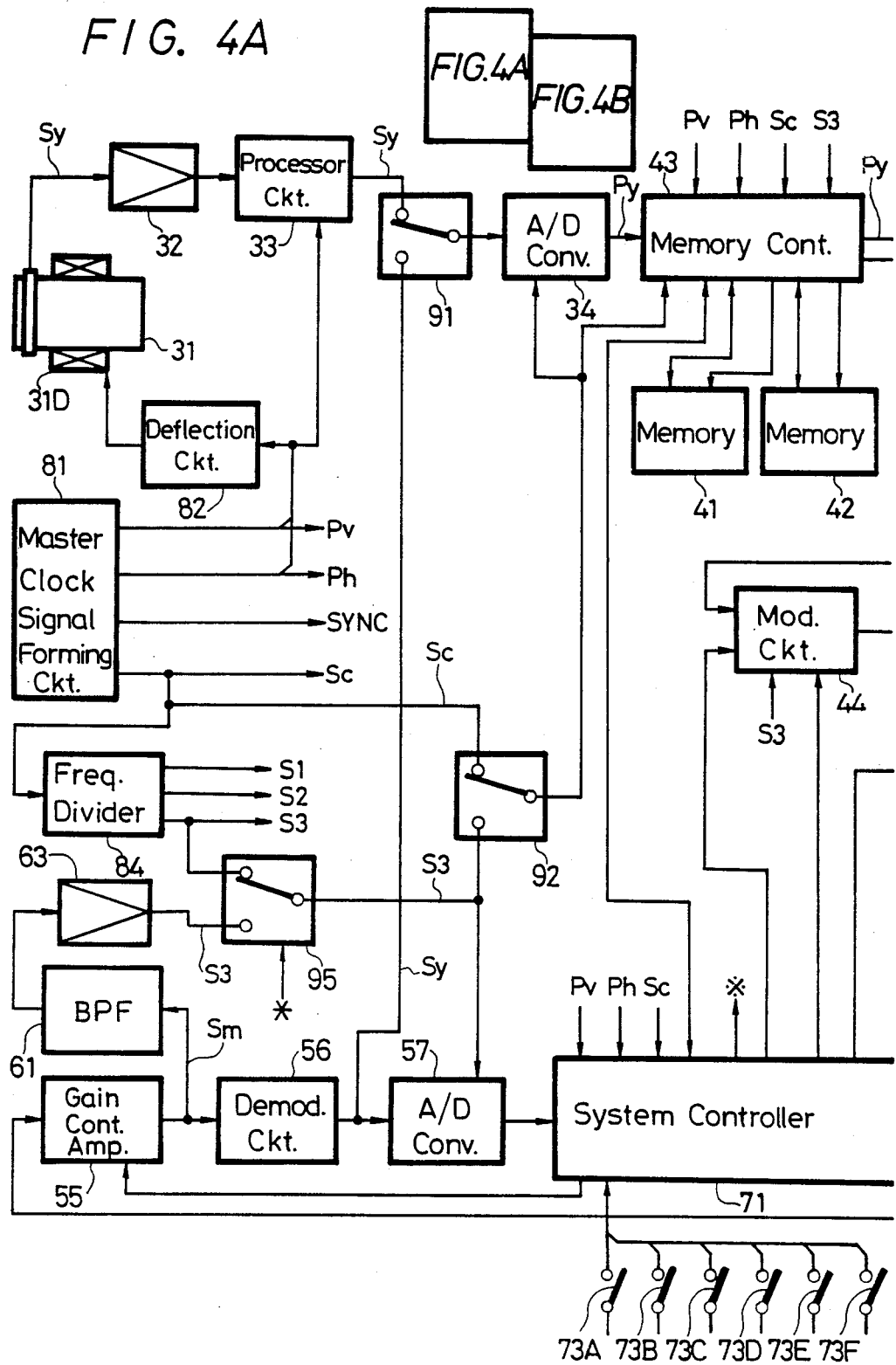
FIGS. 4A and 4B are schematics in block diagram form that when combined show an embodiment of a video telephone according to the present invention.
Figure 4B:
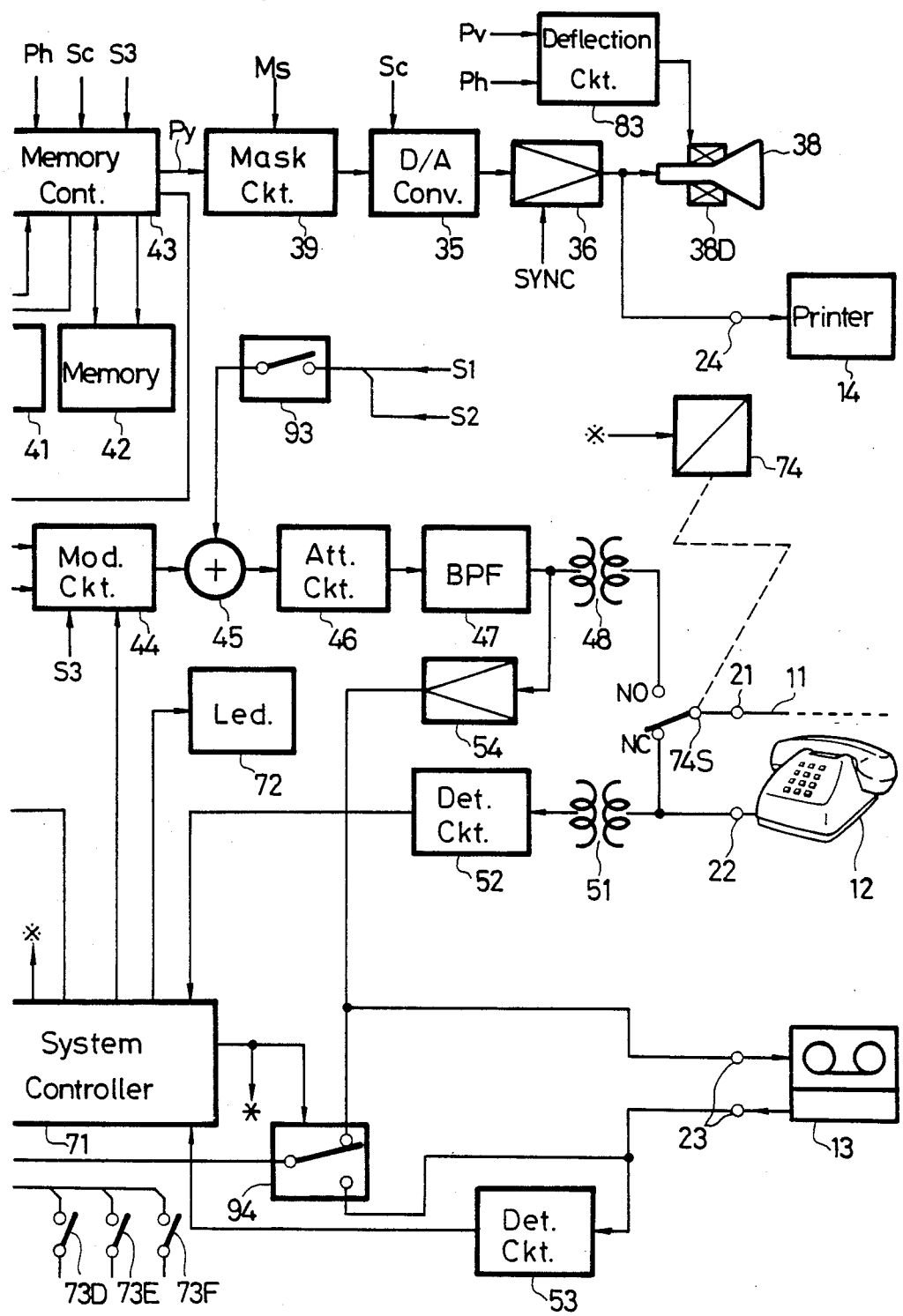

FIGS. 4A and 4B are block diagrams that can be combined to form a complete schematic of an embodiment of a video telephone according to the present invention. In this embodiment, the present invention is constructed in the form of an adaptor that is connected to a standard telephone set to provide a video telephone and employs the above-described specific values. More specifically, a standard telephone network line 11, a standard telephone set 12, an audio tape recorder 13 used to hold image data and a video printer 14 used to print out an incoming still picture as a hard copy are shown in FIG. 4B. The above-mentioned elements 11 to 14 are connected to the video telephone adaptor via connectors 21 to 24.

As shown in FIG. 4A an image pickup tube 31 is provided to detect an image of the user's face or some other desired object. Also provided are a 4-bit analog-to-digital (A/D) converter 34, a 4-bit digital-to-analog (D/A) converter 35, a mask circuit 39 that is used to mask a portion of the display screen in picture mode B, a flat picture tube 38 that displays a picture image, a memory 41 for storing outgoing image data, a memory 42 for storing incoming image data, and a memory controller 43 that controls memories 41 and 42. Each of memories 41 and 42 is formed of a so-called video RAM (random access memory) and has a capacity of 160 addresses×100 addresses corresponding to 160 picture elements×100 picture elements forming one picture screen in mode A. The memory controller 43 is formed of gate arrays and generates signals used to write data in and to read it out from memories 41 and 42. In addition, memory controller 43 also processes the video signal to some extent.

A digital modulating circuit 44 is provided to convert outgoing image data from memory controller 43 into a modulated signal Sm. More specifically, digital modulating circuit 44 converts parallel 4-bit image data into the signal Sm by effecting 4-bit A/D (analog-to-digital) conversion in response to the clock signal $S_3$ supplied thereto.

A detecting circuit 52 is provided to detect the incoming dual tone signal DLTN and a detecting circuit 53 connected to audio recorder 13 is also provided for a similar purpose. A gain control amplifier 55 corrects the level of the received signal on the basis of the received correction signal ACAL. A demodulating circuit 56 is connected to the output of gain control amplifier 55, and a system controller 71 is formed of a micro-computer that controls the operation of the entire system. System controller 71 is provided with a plurality of light emitting diodes (LEDs) 72 used to indicate the operational mode of the system controller 71 and a plurality of keys (or switches) 73A to 73F are used to input the operational mode.

A master clock forming circuit 81 is provided to generate a master clock signal, and it may be fabricated as a so-called one-chip integrated circuit (IC) that is employed by the standard video camera, produced by many manufacturers and generally available on the market so as to generate a synchronizing signal used in the NTSC system. Master clock signal forming circuit 81 may include a crystal oscillator (not shown) and generates a color subcarrier signal Sc of frequency fc, vertical and horizontal synchronizing pulses Pv and Ph, respectively, and a composite synchronizing pulse SYNC.

The vertical and horizontal synchronizing pulses Pv and Ph from master clock signal forming circuit 81 are supplied to a deflection circuit 82 of image pick-up tube 31 for generating vertical and horizontal deflection signals using the vertical and horizontal deflection coils 31D of image pickup tube 31. Similarly, the vertical and horizontal synchronizing pulses Pv and Ph are supplied to a deflection circuit 83 associated with picture tube 38 so that the vertical and horizontal deflection signals can be generated by vertical and horizontal deflection coils 38D of picture tube 38. In this event, the display area of each of the image pickup tube 31 and picture receiving tube 38 is designed to have a so-called overscan area of approximately 15% so that a picture in mode A occupies the entire available area of the picture screen.

The synchronizing pulses Pv and Ph are also supplied to memory controller 43 and system controller 71 for indicating the timing of the luminance signal. The signal Sc from master clock signal forming circuit 81 is supplied to memory controller 43, and is also supplied to system controller 71, particularly, as the clock signal for the central processing unit (not shown) of system controller 71. Further, the signal Sc from master clock signal forming circuit 81 is fed to a frequency dividing circuit 84, where it is divided into the signals $S_1$ to $S_3$.

Signal $S_3$ is then fed to memory controller 43, as well as to modulating circuit 44, as a carrier signal.

Switching circuits 91 to 95 are provided, and these switching circuits are controlled or changed-over by system controller 71 via control signal lines (not shown). A relay contact 74S is provided and has an associated relay device 74, which is also controlled by system controller 71.

When the apparatus is not in use, relay contact 74S is connected in the state shown in FIG. 4B, and hence telephone set 12 is connected to telephone network line 11 via relay contact 74S. Accordingly, telephone set 12 can be used as the standard telephone set, and a standard telephone communication mode is available for an outgoing call.

In the telephone communication mode, if the video telephone is powered, switching circuits 91 to 95 are connected in the states as shown in FIGS. 4A and 4B under control of system controller 71. Then, a luminance signal Sy conforming to the NTSC system is derived from image pickup tube 31 and is supplied through a pre-amplifier 32 to a processor circuit 33, where it undergoes various signal processings such as gamma-correction, automatic gain control (AGC), and the like. The processed signal Sy is supplied to A/D converter 34 through switching circuit 91. Simultaneously, the signal Sc from master clock signal forming circuit 81 is supplied through switching circuit 92 to A/D converter 34 as the clock signal. Thus, the signal Sy is sampled and is subjected to quantization at the frequency fc, thereby resulting in a 4-bit parallel digital luminance signal Py. The digital luminance signal Py is reduced to a signal of 160 picture elements×100 picture elements regardless of the picture screen mode. The resultant signal is then fed to D/A converter 35 via mask circuit 39, which will be described in detail below, and the signal Sc is fed to D/A converter 35 as a clock signal, whereby the signal Py is converted into an analog luminance signal Sy. The analog luminance signal Sy is supplied to and added with the synchronizing pulse SYNC by video amplifier 36, and the combined signal Sy and synchronizing pulse SYNC is fed to picture tube 38.

Accordingly, when the video telephone is powered, there is brought about a monitor mode in which an image picked up by image pickup tube 31 can be monitored on picture tube 38 in the form of a real moving picture.

In the monitor mode, when a "pickup" key 73B among keys 73A to 73F is depressed, system controller 71 controls memory controller 43 in response to the key 73B output, allowing the signal Py from A/D converter 34 to be fed to memory 41 via memory controller 43. Furthermore, memory controller 43 supplies a write signal and an address signal at every cycle of the signal Sc to memory 41, so that from the signal Py one field of image data consisting of 160 picture elements×100 picture elements is written in and stored in memory 41.

When the image data is written into memory 41, memory controller 43 supplies to memory 41 a read signal and an address signal at every cycle of the signal Sc so that the image data stored in memory 41 is repeatedly read out sequentially so as to be derived as a signal Py representing a still picture. The signal Py is fed to D/A converter 35 via memory controller 43 and mask circuit 39. Thus, picture tube 38 displays on its screen either the still picture image data stored in memory 41 or the still picture image provided when "pickup" key 73B is depressed.

When the still picture is displayed, if the "watch" key 73A of keys 73A to 73F is depressed, system controller 71 controls memory controller 43 in response to the 73B key output, causing the apparatus to be again set in the monitor mode, whereby the picture image picked up by image pickup tube 31 is displayed on picture tube 38 as a real moving picture.

Accordingly, by repeating this operation of keys 73A and 73B, it is possible to store the image data of a desired picture image in memory 41. Then, under the condition that the image data is stored in memory 41, in which event a still picture of that image data is displayed on picture tube 38, if the "send" key 73C of keys 73A to 73F is depressed, system controller 71 drives relay device 74 in response to the resultant key 73C output, causing relay contact 74S to be connected in the opposite state (NO) to that shown (NC) in FIG. 4B.

Under the control of system controller 71, the signals $S_1$ and $S_2$ derived from frequency dividing circuit 84 are supplied through switching circuit 93 to a signal adding circuit 45 that produces a summed signal from signals $S_1$ and $S_2$, which is the dual tone signal DLTN. This dual tone signal DLTN is fed to the telephone network line 11 via a signal line formed of an attenuator 46, which restricts the transmission level, a bandpass filter 47, which removes undesired signal components, a transformer 48, and relay contact 74S.

When the dual tone signal DLTN is transmitted in the period $T_1$, then system controller 71 controls modulating circuit 44 and switching circuit 93, thereby providing the blank period, or nonsignal period T2. During the following periods T3 through T5, system controller 71 supplies a predetermined modulating signal to modulating circuit 44 to sequentially generate the signals FSYN, ACAL, and ID. These signals, FSYN, ACAL, and ID are transmitted to the telephone network line 11 via adding circuit 45 and so on, sequentially as described above.

When time period $T_6$ arrives following time period T5, memory controller 43 supplies memory 41 with the read signal and the address signal at every cycle of signal $S_3$ so that image data is read out of memory 41 with the cycles of signal $S_3$, that is, at a rate of one address (corresponding to 4 bits of one picture element) per cycle of signal $S_3$. This image data is supplied through memory controller 43 to modulating circuit 44, in which it is modulated into the modulated signal Sm. This modulated signal Sm is fed to telephone network line 11 in a similar fashion as described above.

In this event, if mode key 73F of keys 73A to 73F designates mode A, the image data of 160 picture elements × 100 picture elements is transmitted as the signal Sm. On the other hand, if it designates mode B, the image data of 90 picture elements × 100 picture elements located at the central portion of the picture screen is transmitted as the signal Sm. During the time periods $T_1$ to $T_6$, LED 72 is caused to flash, thereby indicating the transmission mode of the image data.

When time period $T_6$ terminates, and the transmission of all image data is finished, relay device 74 is rendered inoperative and its relay contact 74S is again connected in the state (NC) shown in FIG. 4B, thus allowing the communication mode.

If "pickup" key 73B is not pressed but "send" key 73C is pressed during the time that the real moving picture is being monitored, the image data at that point in time when key 73C is pressed is stored in memory 41 in the same way as if key 73B had been pressed. Then, that image data is transmitted to telephone network line 11 just as described above.

Further, when the image data is transmitted to telephone network line 11, as set forth above, if tape recorder 13 is set in the recording mode over the time periods $T_1$ to $T_6$, the signals DLTN to Sm are supplied to tape recorder 13 through a buffer amplifier 54 from the bandpass filter 47, whereby these signals are recorded by tape recorder 13.

When on the other hand, incoming image data is received during the telephone conversation, the dual tone signal DLTN placed at the beginning thereof is supplied to detecting circuit 52 via the signal line formed of telephone network line 11, relay contact 74S, and a transformer 51 and the dual tone signal DLTN is thereby detected. The detected output thereof is supplied to system controller 71.

On the basis of the detected output, system controller 71 drives relay device 74 to connect relay contact 74S in the opposite state (NO) t that shown in FIG. 4B, and system controller 71 connects switching circuits 94 and 95 in the states shown in FIGS. 4A and 4B.

Accordingly, when the signals FSYN, ACAL, and ID are transmitted during the time periods $T_3$ to $T_5$, these signals are fed via the signal line formed of telephone network line 11, relay contact 74S, transformer 48, amplifier 54, switching circuit 94, and gain control amplifier 55 to demodulating circuit 56. The demodulated output therefrom is supplied to an A/D converter 57. The signal $S_3$ from frequency dividing circuit 84 is supplied through switching circuit 95 to A/D converter 57 as a clock signal, so that the demodulated output from demodulating circuit 56 is digitized by A/D converter 57. The digital signal from A/D converter 57 is sequentially supplied to system controller 71 over time periods $T_3$ through $T_5$.

Thus, in the time period $T_3$, the reference phase of demodulating circuit 56 during the demodulation is restricted to 0° by the output of system controller 71 on the basis of the frame synchronizing signal FSYN and is then used as the synchronizing signal in system controller 71 for the signals supplied after the time period $T_4$. In the time period $T_4$, the gain of amplifier 55 is controlled by an output of system controller 71 on the basis of the correcting signal ACAL, and the signal levels supplied thereafter are corrected. Further, in the time period $T_5$, a predetermined preparation for the following image data (signal Sm) is made by system controller 71 on the basis of the identification code ID. For example, switching circuits 91 and 92 are connected in the respective opposite states to those illustrated in FIG. 4A, and a signal indicating whether the image mode is mode A or mode B is supplied to memory controller 43 from system controller 71.

In the time period $T_6$, the signal Sm is derived from amplifier 55, and the signal Sm is supplied to demodulating circuit 56 wherein the analog luminance signal Sy is demodulated, that is, the luminance signal Sy indicative of the white/black gradation level of one picture element is demodulated per cycle of the signal Sa. The signal Sy is supplied through switching circuit 91 to A/D converter 34, and the signal $S_3$ from frequency dividing circuit 84 is supplied through switching circuits 95 an 92 to A/D converter 34 and memory controller 43 as a clock signal.

Thus, the luminance signal Sy from demodulating circuit 56 is converted to the digital signal Py (image data) in A/D converter 34 in synchronism with the signal $S_3$ from frequency dividing circuit 84. The digital signal Py is supplied through memory controller 43 to reception memory 42. The write signal and the address signal in synchronism with the signal $S_3$ from frequency dividing circuit 84 are supplied from memory controller 43 to memory 42, whereby the digital signal Py is sequentially written into and stored in memory 42.

The picture mode is identified on the basis of the transmission of the identification code ID. In the case of mode A, the image data is sequentially written into the entire address area of memory 42, while in the case of mode B, the image data is written only into the address area of memory 42 corresponding to the central portion of the screen of picture tube 38.

In this event, at the same time that the digital signal Py is written into memory 42 the read signal and the address signal for mode A are supplied from memory controller 43 to memory 42 at the intervals of the signal Sc, whereby the image data stored in memory 42 is sequentially and repeatedly read out from the entire address area of memory 42 and is derived as the signal Py that represents a still picture. The still picture signal Py is supplied through mask circuit 39 to D/A converter 35. Thus, the incoming image data is displayed on picture tube 38 as a still picture, representing modes A or B from its upper edge in accordance with the transmission rate thereof. Upon completion of time period $T_6$, a complete still picture will be displayed on picture tube 38.

In the time periods $T_1$ to $T_6$, wherein the image data is received and processed, LED 72 is caused to flash indicating that the image mod is the reception mode of the image data.

When time period $T_6$ is completed then relay device 74 is rendered inoperative, whereby relay contact 74S is again connected in the state (NC) shown in FIG. 4B, and switching circuits 91 to 95 are also connected in the states shown in FIGS. 4A and 4B for providing the communication mode thereafter.

In the reception mode of the image data, if tape recorder 13 is set in the recording mode over the time periods $T_1$ to $T_6$, then the incoming signals DLTN to Sm are recorded by the tape recorder 13.

As set out above, when the incoming image data is transmitted, that image data is stored in memory 42 and is displayed on picture tube 38 as a still picture. When the outgoing image data is stored in memory 41 and the incoming image data is stored in memory 42, if the "outgoing" key 73D of keys 73A to 73E is depressed, then the image data will be read out of memory 42. Thus, the read-out image data is converted into the luminance signal Sy and then is supplied to picture tube 38. On the other hand, if "incoming" key 73E is depressed, then the image data will be read out of memory 41, and the resultant image data converted into the luminance signal Sy and fed to picture tube 38. Therefore, depending upon the operation of keys 73D and 73E, one or the other of the outgoing picture and the incoming picture can be freely selected and displayed on picture tube 38.

When telephone set 12 is not being used, if the signals recorded in tape recorder 13 over the time periods $T_1$ to $T_6$ are reproduced, the dual tone signal DLTN placed at the beginning of the reproduced signals is detected by detecting circuit 53 and, on the basis of the detected output, switching circuits 92, 94, and 95 are connected in the states opposite those shown in FIGS. 4A and 4B. Therefore, instead of the signal transmitted from telephone network line 11 the reproduced signals from tape recorder 13 are supplied to amplifier 55, and the signal Sm from amplifier 55 is supplied through a band-pass filter 61 to a limiter amplifier 63, wherein the signal $S_3$ is extracted from the signal Sm. The signal $S_3$ is then supplied through switching circuits 95 and 92 to A/D converter 34 and to memory controller 43 as a clock signal used in reproducing the tape and the signal is processed in a similar fashion, so that the image data recorded on the tape of tape recorder 13 is displayed on picture tube 38. Thus, if tape recorder 13 is suitably prepared, it is possible to keep a desired still picture on file.

The operations of memories 41, 42 and memory controller 43 in the modes A and B will be described in relation to FIG. 5, which represents an address map of memories 41 and 42 of FIG. 4A that has a capacity of 160 addresses × 100 addresses and 4 bits per one address corresponding to 160 picture elements × 100 picture elements and the 4-bit image data per one picture element in the mode A. In FIG. 5, numbers [0] to [15999] represent the respective address numbers. Memories 41 and 42 are each formed of a so-called video RAM (random access memory), wherein respective data at the 0th, 159th, 15840th and 15999th addresses correspond to the respective picture elements at the upper left, upper right, lower left and lower right picture elements on the picture screen in mode A. When the image data stored in memory 41 or 42 is to be displayed on picture tube 38, regardless of the picture mode, the image data is read out from all of the addresses in memory 41 or memory 42, that is, from the addresses corresponding to the horizontal and vertical scanning positions of picture tube 38 in mode A. In that regard, it should be noted that the key output from mode key 73F is identified by system controller 71 and the result supplied to memory controller 43.

When, for example, the image data representing the user's own still image is written in memory 41 by pressing "pickup" key 73B, regardless of the picture mode specified by mode key 73F, the image data at respective scanning positions is written in all the addresses of memory 41, and these addresses then correspond to the horizontal and vertical scanning positions of image pickup tube 31 in mode A.

Because the image data are read from all the addresses of memory 41, the user's own still picture is displayed on picture tube 38 in mode A regardless of the picture mode specified by mode key 73F.

When mode A is specified by mode key 73F, if the "send" key 73C is depressed, the image data stored in the 0th to 15999th addresses in memory 41 are sequentially read out during the time period $T_6$ in the order of the addresses, that is, in the order of operation of image pickup tube 31, with signal $S_3$ as a clock signal, and are converted to the signal Sm to be delivered to telephone network line 11.

On the other hand, when mode B is specified by mode key 73F, if the "send" key 73C is depressed, the image data stored in the addresses, for example, within the double lines in FIG. 6, that is, within a rectangular address area bounded by the 32nd, 127th, 15872nd and 15967th addresses at the corners, are sequentially read out during the time period $T_6$ in the order of the addresses, using the signal $S_3$ as a clock signal, and are converted into the signal Sm to be delivered to telephone network line 11.

When the incoming image data is transmitted, the picture mode is identified from the identification code ID by system controller 71, and the identified result is fed therefrom to memory controller 43.

When the picture screen mode is mode A, the image data is written in the received order into all of the addresses of memory 42 in the sequential order of the addresses during the time period $T_6$. Because at this time the read-out operation for the display is carried out from all the addresses of memory 42, as described above, picture tube 38 displays precisely the image data transmitted in mode A.

If the transmitted image data is in mode B, the image data will be written, in the received order, into addresses of memory 42 only into the area defined by the double lines in FIG. 6, in the sequential order of only those addresses during the time period $T_6$.

The read-out operation is effected from all addresses of memory 42 for display so that if the read-out operation is carried out from the addresses outside the area defined by the double lines, the data will be old image data from a previous mode A operation or the like, which will be masked by mask circuit 39. Therefore, picture tube 38 displays the image data transmitted in mode B.

Thus, according to the present invention, the image data is transmitted or received and then displayed. In this case, particularly in accordance with the present invention, memories 41 and 42 are provided with an address size corresponding to mode A operation. In mode A, all available addresses are employed to transmit or receive the image data and to read out same for display, whereas in mode B the image data is transmitted from or received at addresses corresponding to less than all of the available memory, for example, the portion of the memory corresponding to the center of the picture screen. Nevertheless, the read-out for display in mode B is carried out from all addresses of the memory, whereby when the received image data is displayed, it is not necessary to modify the generating method of read-out address or the like for the memory 42 regardless of whether mode A or B operation is selected. This is particularly desirable because the read-out address for display changes at a relatively high speed corresponding to the horizontal and vertical scannings so that were it to be changed to accommodate mode A or mode B, the construction of memory controller 43 will become complicated. The present invention, however, does not require such a modification, so the design and the construction of memory controller 43 will be simplified.

Further, when a picture is frozen and is provided as a still picture, in order to transmit the image data the picture mode need not be determined in advance and the video telephone of the invention becomes easy to use.

FIG. 7 is a block diagram showing an example of the mask circuit 39 of FIG. 4B and in which digital luminance signal Py includes four bits that are provided at outputs $2^0$, $2^1$, $2^2$, and $2^3$ of memory controller 43. More specifically, a $2^0$-bit output terminal of memory controller 43 is connected through an AND circuit 100 to a $2^0$-bit input terminal of D/A converter 35; a $2^1$-bit output terminal of the memory controller 43 is connected through an AND circuit 101 to a $2^1$-bit input terminal of D/A converter 35; a $2^2$-bit output terminal of memory controller 43 is connected through an AND circuit 102 and an OR circuit 105 to a $2^2$-bit input terminal of D/A converter 35; and a $2^3$-bit output terminal of memory controller 43 is connected through an AND circuit 103 to a $2^3$-bit input terminal of D/A converter 35.

A blanking pulse signal BLKA, which becomes "1" during the horizontal display period in mode A, as shown in FIG. 8A, and a blanking pulse signal BLKB, which becomes "1" during the horizontal display period in mode B, as shown in FIG. 8B, are supplied from memory controller 43 to a switching circuit 106. Further, a mode switching signal Ms is also derived from the system controller 71, and this signal Ms is supplied to switching circuit 106 as its control signal so that switching circuit 106 allows the signal BLKA to pass therethrough in mode A, while the switching circuit 106 allows the signal BLKB to pass therethrough in mode B. The output of switching circuit 106 is supplied commonly to AND circuits 100 to 103. Memory controller 43 also forms a mask signal MASK that becomes "1" when BLKA="1" and BLKB="0", as shown in FIG. 8C. In response to the mode switching signal Ms in mode B, the mask signal MASK is supplied through a switching circuit 107 to OR circuit 105, whereas in mode A the signal "0" is supplied through switching circuit 107 to OR circuit 105.

Figure 9A:
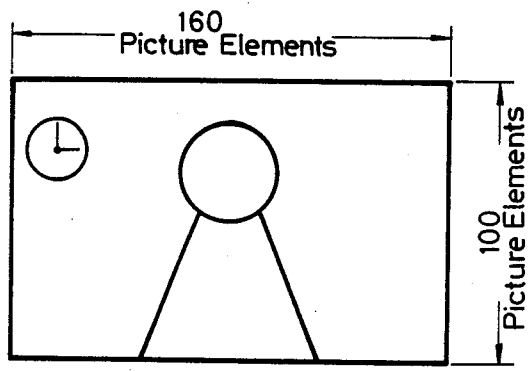
FIGS. 9A and 9B are, respectively, pictorial representations of displayed pictures provided by the present invention.
Figure 9B:
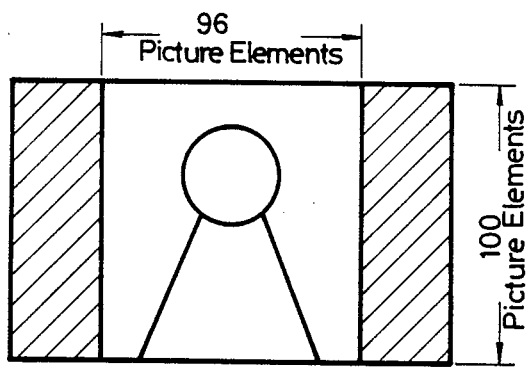

Therefore, in mode A the signal BLKA is supplied to AND circuits 100 to 103 and a signal "0" is supplied from switching circuit 107 to OR circuit 105, so that the image data $2^0$ to $2^3$ from memory controller 43 are fed as they are to D/A converter 35 via AND circuits 100 to 103 and OR circuit 105. Thus, as shown in FIG. 9A, in mode A it is possible to obtain image picture data formed of 160 picture elements×100 picture elements. In mode B, when BLKB="1" and MASK="0" are satisfied during the horizontal display period (a period of 96 picture elements), an image of mode B is displayed at the center of the picture screen, as shown in FIG. 9B. In that case, during the remaining period BLKB="0" and MASK="1" are satisfied so that the level of the input terminal $2^2$ of D/A converter 35 goes to "1" and the levels of the other input terminals $2^0$, $2^1$, and $2^3$ go to "0". Thus, during the remaining period the incoming data of memory controller 43 becomes "0100", representing the gray level of the 4th gradation. As shown in FIG. 9B, image data of 96 picture elements×100 picture elements is displayed at the center of the picture screen, whereas both side portions of the picture screen, or two areas of 32 picture elements×100 picture elements shown by hatched lines, become gray corresponding to the level of the 4th gradation.

While in th embodiment described above telephone set 12 and tape recorder 13 are formed separately, they may be formed as a single unit. If so, image data will be recorded in a so-called automatic answering telephone, and the image data will further be transferred to another video telephone for display. Similarly, although switching circuits 92 and 95 were described as being formed independently of memory controller 43, they may be included in memory controller 43.

Further, in the foregoing embodiment the signal Py can be simultaneously written into and read out from memories 41 and 42; this can be realized by a dual port RAM or the like. It is also possible, with the provision of a buffer memory, to achieve an apparent simultaneous read-out and write-in by transferring the image data between the buffer memory and memories 41 and 42 during the horizontal blanking period.

While in the foregoing embodiment most of signal processing, such as the signal processing effected by demodulating circuit 56 or the like, is represented as being accomplished by hardware in order to facilitate an understanding of the invention, such signal processing can also be performed by the system controller (microcomputer) 71 and its software.

Because in the foregoing embodiment the image data received in time period $T_6$ is sequentially written into memory 42 and the image data is read out of memory 42 for display at the same time, the displayed picture is the picture corresponding to the received image data in the receiving area of the image data but another picture based on previous image data would be displayed in the area in which new image data has not yet been received. Nevertheless, when such display is not acceptable, the signals BLKA and BLKB are both rendered "0" and the mask signal MASK is rendered "1", so that the area in which the image data has not yet been received becomes gray according to the 4th gradation, avoiding the display of portions of the previous picture.

Upon transmission and reception of the image data, if the picture mode is the B mode, the read address area must be changed as in the area shown by the double lines in FIG. 6. This can be realized by an address counter that is controlled by the signals Sc, Ph, and Pv. In that event, the read address, even though it is changed as in the area shown by the double lines in FIG. 6, is changed at a transmission and reception rate of the image data, or at the frequency $F_3$ (=1748 Hz) of the signal $S_3$ so that the read address can be prevented from being made complex. Alternatively, the address processing may be performed by system controller 71.

When it is intended to displace the position of the picture in mode B from the center of the picture screen in the horizontal direction, the addresses of the area shown by the double lines in FIG. 6 corresponding to memories 41 and 42 may be changed accordingly.

According to the present invention and as described above, memories 41 and 42 are arranged to have respective address capacities corresponding to mode A, wherein in mode A all the addresses thereof are utilized to transmit, receive, and read the image data for display, while in mode B the image data is transmitted and received for the addresses corresponding to only the center of the picture screen, for example, but the image data is read out of all the addresses for display. Thus, when the received image data is displayed, regardless of mode A or mode B, it is not necessary to change the method for forming the read address or the like for the memory. In other words, the read address for display is changed at a relatively high speed corresponding to the horizontal and vertical scanning so that if it is changed in response to mode A or mode B, the circuit arrangement of the memory controller becomes complicated. In accordance with the present invention, it is not necessary to change the read address, so that the memory controller can be easily designed and its construction can be simplified.

Further, when the picture is frozen as a still picture in order to transmit the image data, it is not necessary to determine the picture mode in advance, in which case the video telephone of the invention can be made very easy to use. Also, when a picture of small size among a plurality of picture sizes is displayed, or in the case of mode B, the picture portion outside the small-size image is masked by, for example, the gray mask so that undesired image data left in the video memory is made free from complicated processing and only the desired picture is displayed. Thus, it is possible to display skillfully a plurality of image data representing different picture sizes.

It should be understood that the above description of preferred embodiments is presented by way of example only and it will be apparent that many modifications and variations thereof could be effected by one with ordinary skill in the art, without departing from the spirit and scope of the novel concepts of the invention, which should be determined only by the appended claims.

What is claimed is:

1. A video telephone in which image data of a still picture in a first picture mode and image data of a still picture in a second picture mode are transmitted through an audio signal transmission line and a still picture in the first or second mode is displayed, with the second mode picture being smaller than the first mode picture, comprising;

a memory having an address capacity determined by the size of the still picture in the first picture mode; and memory control means for controlling the writing of data so that when image data of a still picture in the first picture mode is received said image data is written in all addresses of said memory, for controlling the writing of data so that when image data of a still picture in said second picture mode is received said image data is written into a predetermined area that includes less than all of said addresses of said memory, and for controlling the reading out of data from said memory so that data in all addresses of said memory is read out for display of a still picture in said first picture mode and said second picture mode.

2. A video telephone according to claim 1, wherein said image data includes mode identification data and said memory control means is responsive to said mode identification for controlling the writing in of image data in said first and second picture modes.

3. A video telephone according to claim 1, further comprising a tape recorder connected to said memory for recording image data read out therefrom.

4. A video telephone according to claim 1, wherein said image data is digital data and further comprising:

a digital-to-analog convertor for producing an analog image data signal; and a printer receiving said analog image data signal for producing a printed picture therefrom.

5. A video telephone according to claim 1, further comprising a mask circuit connected to receive the image data read out from said memory and being responsive to a mode signal from said memory controller means for causing image data read out from addresses in said memory outside of said predetermined area in said second picture mode to be displayed at a constant gray level.

6. A video telephone according to claim 1, wherein said memory comprises first and second video random access memories each connected to receive said image data through said memory control means.

7. A video telephone in which image data of a still picture in a first picture mode and image data of a still picture in a second picture mode are transmitted through a transmission line having an audio frequency bandwidth and in which the second picture mode provides a picture smaller than in the first picture mode, comprising:

a memory for storing said image data;

means for controlling writing in and reading out of image data from said memory display means for displaying a respective picture of said first and second picture modes; and a mask circuit receiving image data from said memory and connected to said display means, whereby read-out image data is supplied through said mask circuit to said display means, said mask circuit being responsive to said means for controlling so that when said image data represents said second still picture, a picture portion outside said second still picture is masked by predetermined data.

8. A video telephone according to claim 7, wherein said display comprises a video monitor and said mask circuit provides said predetermined data to said video monitor so that said still picture in said second mode is in a central area from top to bottom of said screen and areas of said screen on either side thereof are rendered gray.

9. A video telephone according to claim 7, wherein said memory has an address capacity to accommodate all image data of the still picture in the first picture mode.

10. A video telephone according to claim 9, wherein said means for controlling controls writing in of image data in said second picture mode into said memory in addresses therein corresponding to an area that is less than the address capacity of said memory.

11. A video telephone according to claim 7, further comprising a tape recorder for recording image data read out from said memory.

12. A video telephone according to claim 7, wherein said image data is digital data and further comprising;

a digital-to-analog convertor for converting a digital image signal read out from said memory to an analog signal; and a printer receiving said analog image signal and producing a printed picture therefrom.

* * * * *

UNITED STATES PATENT AND TRADEMARK OFFICE
CERTIFICATE OF CORRECTION

PATENT NO. : 4,979,028

DATED : December 18, 1990

INVENTOR(S) : Toru Minematsu and Haruki Nagayama

It is certified that error appears in the above-identified patent and that said Letters Patent is hereby corrected as shown below:

Col. 1, line 51, change "," to --.--

Col. 4, line 60, after "Fig. 4A" insert --,--

Col. 8, line 22, change "+" to --to--

Col. 9, line 35, change "mod" to --mode--

Col. 12, line 51, change "th" to --the--

Col. 15, line 5, after "memory" insert --;--

Signed and Sealed this

Fourteenth Day of July, 1992

*Attest:*

DOUGLAS B. COMER

*Attesting Officer*   *Acting Commissioner of Patents and Trademarks*